Figure 1:
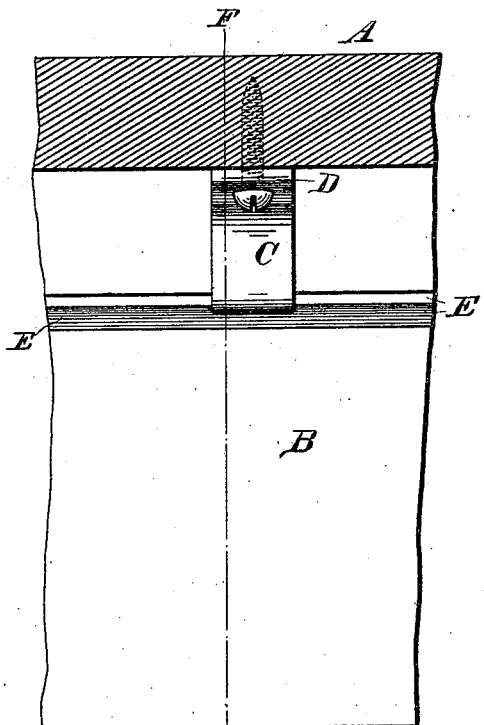
Figure 2:
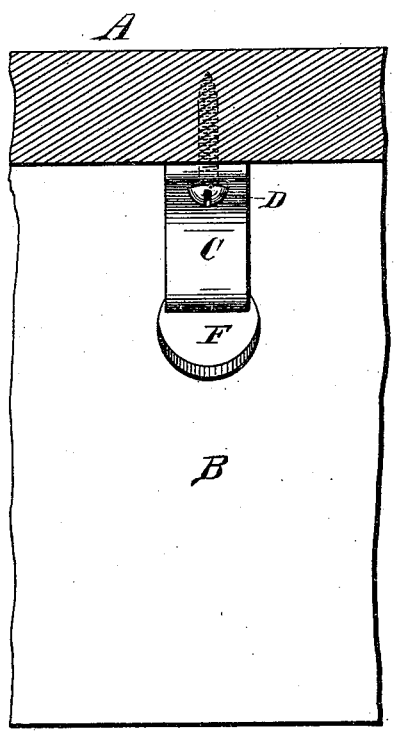
Figure 4:
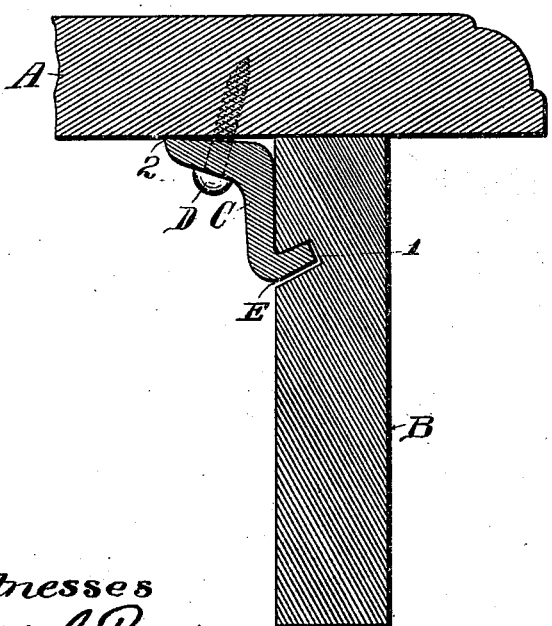
Figure 3:
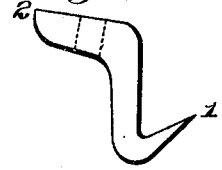

(No Model.)

G. C. GOODYEAR.
FURNITURE FASTENER.

No. 501,564. Patented July 18, 1893.

Witnesses

Inventor
Geo. C. Goodyear

UNITED STATES PATENT OFFICE.

GEORGE C. GOODYEAR, OF FLINT, MICHIGAN.

FURNITURE-FASTENER.

SPECIFICATION forming part of Letters Patent No. 501,564, dated July 18, 1893.

Application filed December 3, 1892. Serial No. 453,975. (No model.)

*To all whom it may concern:*

Be it known that I, GEORGE C. GOODYEAR, a citizen of the United States, residing at Flint, Genesee county, Michigan, have invented a new and useful Device for Fastening Tops on Tables, Stands, Sideboards, &c., as set forth in the following specification.

The old and almost only way at present of fastening tops or parts of this kind is to bore two holes in the rail or side, a large one partly through the rail or side at an obtuse angle to make a bearing for the head of a screw, and a small one at right angles with the large one and beginning at the edge of the large hole and boring through the edge of the rail or side to admit the screw itself. For instance in fastening the top of an ordinary extension table it takes fourteen screws, calling for the boring of twenty eight holes, a lengthy operation, and it often happens that the wood will split or break away when the screw is driven down, in which case it takes considerable time to make a new hole.

The object of the "fastener" is to fasten tops or other parts of tables, stands, sideboards, counters, or any other article of furniture where a firm fastening in a square corner or at a right angle must be effected without the visible use of nails or screws on the face sides, and to do so at about one fourth of the cost of the old way. The accompanying drawings will explain my invention and the use thereof.

Figure I— shows the inside face of the rail, or side, "B—" the groove, "E" the width of fastener "C—," and the screw or screw nail "D," driven in place into the top "A—" to be fastened. Fig. II— shows the fastener used with a bit hole instead of the groove "E—." Fig. III— shows the "fastener" with a flat but sharp dog, or catch, sharpened the full width of same—not pointed. Fig. IV— shows section of same through "F F—" of Fig. I.

The "fastener" consists of a small metal angle—with a dog or catch or sharp flat spur at one end marked "1—" and a nail or screw hole or holes through the opposite flange, the faces of the same at a slightly obtuse angle to each other so that the extreme ends "1—" "2—" will touch the respective parts to be fastened together first—and the driving home of the screw or nail will cause the parts to bind closely together and also hold the catch or dog on the end "1—" firmly into the groove "E—." The closer or tighter the nail or screw is driven the more closely will this fastener hold the parts together. The slight space shown between the flange "2—" and the top "A—" is left so that when the screw or nail is driven down the fastener acts as a lever and causes both ends to set more closely to the parts to be fastened also causing the catch "1—" to draw and set firmly into the wood. The bearing on the end "1—" being near the center of the rail causes the same to set squarely upon the part "A—."

To use the "fastener" on an ordinary table, instead of boring twenty eight screw holes it requires simply to cut the groove "E—" on a slight bevel to fit the catch "1—" on the inside of the rail "B—" to receive the catch "1—." This can be done on a grooving saw in about the same time required to bore one of the twenty eight holes mentioned before.

To fasten the parts together with this fastener—simply place them in position—slip the catch "1" of fastener "C—" into the groove "E—" wherever wished—insert a screw or screw nail in the hole in flange "2—" and drive it home into the top "A—." If the screw nail, or nail is used this of course would be quickly done with a hammer doing away with expensive screws and the use of a screw driver.

Bit holes bored at a slightly obtuse angle to receive the catch "1—" can be used instead of the groove "E—" if desired.

The fastener shown in Fig. III is used when the nature of the article on which it is to be used will not admit the making of a groove or bit hole. For this reason the catch or dog is sharpened flat the full width of the fastener.

The "fastener" is made of cast or malleable iron or other metal—or stamped out of steel or other metal one-eighth inch thick and five-eighths inch wide or of other dimensions to suit the work upon which they are to be used. The cutting—bending—sharpening of the catch "1—" (if made sharp) can be done by one blow of a "drop hammer" or a single revolution of an iron shear machine.

What I claim as my invention, and wish to secure by Letters Patent, is—

The metal fastener "C—" with its end "1—" bent at an angle of about sixty degrees to form a catch—and fit the groove "E—" or bit hole "F—" in rail "B—" and its other end "2—" bent at a slightly obtuse angle to the face resting against the rail "B—" and a nail or screw hole through the end of flange "2—."

GEORGE C. GOODYEAR.

Witnesses:
CHARLES S. BROWN,
B. J. MCDONALD.